United States Patent [19]

Chao

[11] Patent Number: 5,442,415
[45] Date of Patent: Aug. 15, 1995

[54] ARMLESS TRANSPARENCY PROJECTOR

[75] Inventor: Zu W. Chao, Hsinchu, Taiwan

[73] Assignee: Industrial Technology Research Institute, Taiwan, Taiwan

[21] Appl. No.: 288,697

[22] Filed: Aug. 15, 1994

[51] Int. Cl.⁶ .............................................. G03B 21/28
[52] U.S. Cl. .............................. 353/119; 353/DIG. 3
[58] Field of Search .................. 353/119, DIG. 3, 63, 353/64, 98, 99, 122

[56] References Cited

U.S. PATENT DOCUMENTS

| 5,033,842 | 7/1991 | Tam | 353/119 |
| 5,090,800 | 2/1992 | Ushiroe | 353/DIG. 3 |
| 5,321,450 | 6/1994 | Shapiro et al. | 353/119 |
| 5,325,137 | 6/1994 | Konno et al. | 353/DIG. 3 |

Primary Examiner—William A. Cuchlinski, Jr.
Assistant Examiner—William C. Dowling
Attorney, Agent, or Firm—Michael D. Bednarek; Marks & Murase

[57] ABSTRACT

An armless transparency projector comprises: a projector main body having an opening; a light source lamp installed inside the projector main body for emitting light needed to project a picture on a distant screen; a Fresnel lens tilted at an angle as to catch the light from the light source, and installed inside the projector main body for holding a transparency; an image reflecting mirror installed inside the projector main body for reflecting the converging light from the Fresnel lens; and a projector lens installed inside the projector main body for projecting the image converged through the aperture of the projector lens along the light axis, to the distant screen.

8 Claims, 2 Drawing Sheets

ARMLESS TRANSPARENCY PROJECTOR

BACKGROUND OF THE INVENTION

The present invention relates generally to a transparency projector, and more particularly to an armless transparency projector.

Generally, most overhead transparency projectors have an arm to hold the reflection lenses in overhead position for projecting images onto the wall or screen. This arm becomes an obstacle to block the audience's vision, especially in the small-spaced conference room. In large conference room, some people place the projector at one corner to avoid this problem, but yet it still occasionally blocks the vision of those who sit at that corner, and at the same time all the audience have to look towards that corner by twisting themselves in such an uncomfortable posture in order to read the screen or wall.

SUMMARY OF THE INVENTION

In view of this shortcomings, it is the primary object of the present invention to provide an armless overhead transparency projector to remove the blind spots of audience's vision, and thereby enhancing the practicality of the overhead transparency projector.

In order to achieve this goal, this invention puts all the optical devices inside of the arm in the main case of the projector and to utilize the idea of rotating conventional optical axis so that the arm can be removed without affecting the performance. It includes a light source, a Fresnel lens, an imaging reflector, a projection lens, and a projection reflection mirror. When the light beam emitted from light source passes through Fresnel lens and a transparency, pad of light is blocked by the pattern on the transparency and thus producing an image which is later reflected through projection lens that projects this image onto the screen or wall.

BRIEF DESCRIPTION OF DRAWINGS

The present invention can be more fully understood by reference to the following detailed description and accompanying drawings, which form the integral pad of this application, and wherein.

DETAILED DESCRIPTION OF PREFERRED EMBODIMENTS

Figure 1:
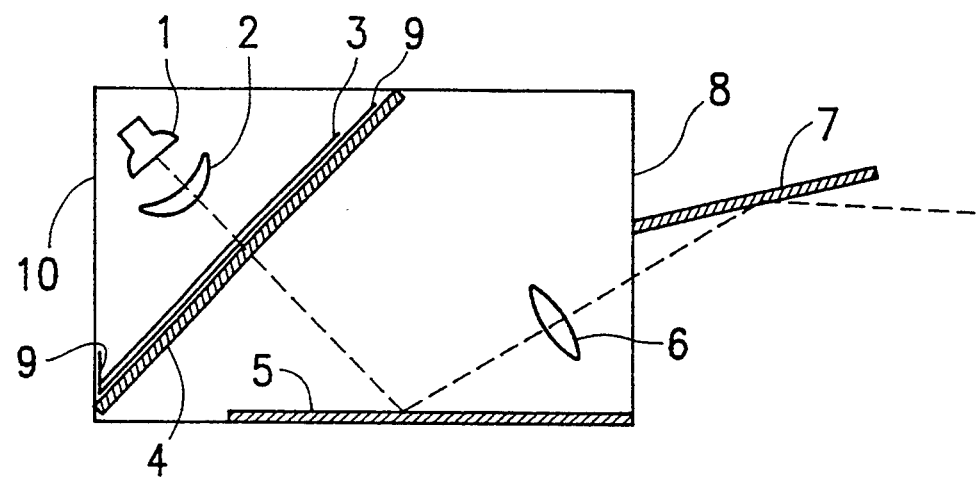
FIG. 1 is a side view of the structure of this invention.

Referring to FIG. 1, the armless transparency projector comprises a light source 1, a light adjusting lens 2, a Fresnel lens 4, an image reflector mirror 5, a projector lens 6, and a projector mirror 7. All devices mentioned above are contained in a projector casing 10 with opening. The light is diverged when first emitted from light source. It is then regulated by lens 2 and projected onto a Fresnel lens 4. Once the light passes through, it is converged and reflected by mirror 5 to enter the effective pinholes of projector lens 6 which projects the pattern on the transparency 3 onto the remote wall or screen to produce large and clear image projection. The projector lens 6 may be fine-tuned to obtain the best picture. Also in the projection path, the angle of projection is fine-tunable to get the best picture.

Figure 2:
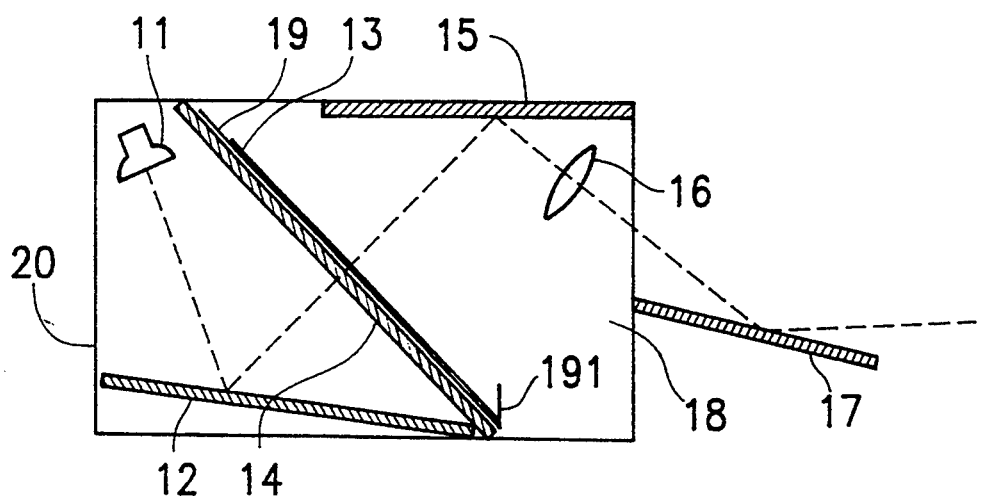
FIG. 2 is a another layout of this invention.

Referring to FIG. 2, wherein the structure of another preferred embodiment of this invention is disclosed as follows:

The optical axis is tilted at 45° from vertical position. Reflection Mirrors 12, 15 are placed at the top and the bottom of the interior of projector casing 20 source lamp 11, a Fresnel Dens 14, and a projector lens 16 are installed in corresponding positions. Also at the opening of casing 20, place a reflection mirror 17. This is the entire optical system.

Figure 3:
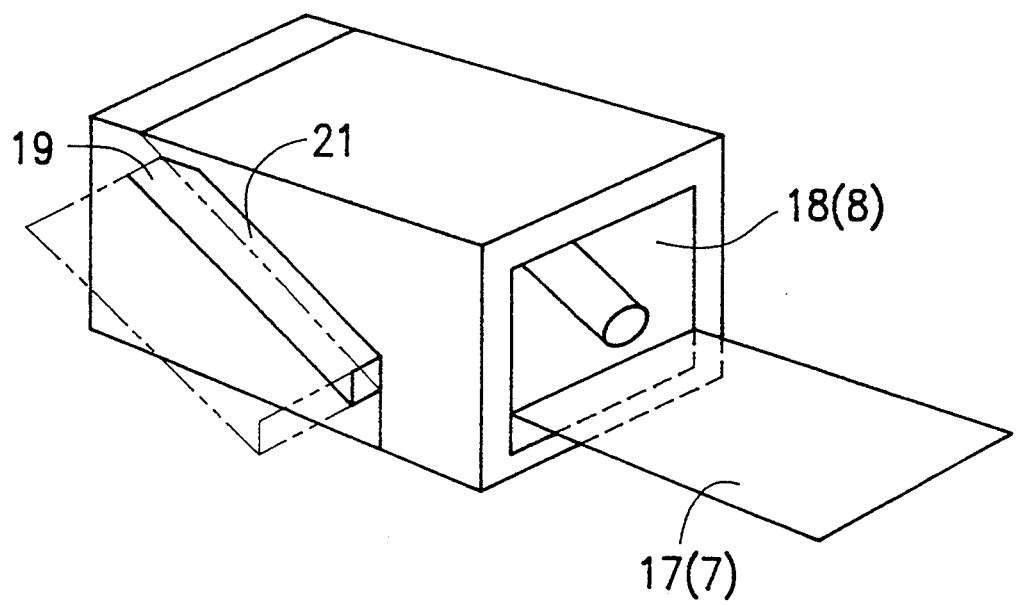
FIG. 3 is a exterior casing of the projector of this invention.

FIG. 3 is the appearance of the projector of this invention. In between the Fresnel lens 4 and transparency 3, there is a guiding groove board 19 which may be pulled out from the side. At the bottom of guiding groove board 19, there is a stopper 191 which stops the transparency from sliding down. Moreover, the transparency will produce static charges that will stick the transparency onto the board 19 without warp. A major advantage of standing the transparency in reclining position over a flat laid position is that the picture is always shown in upright position as opposed to the situation of misalignment of transparency as in conventional projector.

The following Table 1 is the comparison of prior art and this invention:

TABLE 1

| Feature | Prior art | this invention |
| --- | --- | --- |
| appearance | arm | no arm |
|  | vision blocking | vision clear |
| applied spec. of transparency | A4 | A4 |
|  | 300 W | 300 W |
| light source lamp | need cooling | no cooling |
|  | noise/energy consuming | quiet/energy saving |

The invention has been described above in terms of some important, preferred embodiments; however, this invention is not limited to the disclosed embodiments. On the contrary, for a person skilled in the art, it is intended to cover various modifications and similar arrangements included within the spirit and scope of the appended claims, the scope of which should be accorded the broadest possible interpretation so as to encompass all such modifications and similar structures and processes.

What is claimed is:

1. An armless transparency projector comprising:
    a projector main body having an opening;
    a light source installed inside said projector main body for emitting light needed to project an image on a distant screen;
    a Fresnel lens being passed by the light from said light source for converging the light to be a converging light, and installed inside said projector main body for holding a transparency;
    an image reflecting mirror installed inside said projector main body for reflecting the converging light from said Fresnel lens;
    a projector lens installed inside said projector main body for projecting an image converged through the aperture of said projector lens along the light axis, to the distant screen; and
    a guiding board installed between said Fresnel lens and the transparency, with a stopping strip to prevent the transparency from falling off.

2. An armless transparency projector as claimed in claim 1, wherein said projector further includes a projection mirror for reflecting the light from projector lens and adjusting the position of projected image.

3. An armless transparency projector as claimed in claim 1, wherein said guiding grooved board matches a slot opening on one side of said projector main body so it can be slid in and out from said slot opening.

4. An armless transparency projector as claimed in claim 1 or claim 2, wherein said projector further includes a light adjusting lens installed between said light source lamp and said Fresnel lens, on the light axis, for spreading the light from light source lamp to all over the surface of said Fresnel lens;

5. An armless transparency projector comprising:
a projector main body having an opening;
a light source lamp installed inside said projector main body for emitting light needed to project an image on a distant screen;
a light source reflection mirror for reflecting the light from said light source lamp;
a Fresnel lens being passed by the light reflected by said light source reflection mirror for converging the light to be a converging light, and installed inside said projector main body for holding a transparency;
an image reflecting mirror installed inside said projector main body for reflecting the converging light from said Fresnel lens;
a projector lens installed inside said projector main body for projecting an image converged through the aperture of said projector lens along the light axis, to the distant screen; and
a guiding board installed between said Fresnel lens and the transparency, with a stopping strip to prevent the transparency from falling off.

6. An armless transparency projector as claimed in claim 5, wherein said guiding board matches a slot opening on one side of said projector main body so it can be slid in and out from said slot opening.

7. An armless transparency projector as claimed in claim 5, wherein said projector further includes a projection mirror for reflecting the light from projector lens and adjusting the position of projected image.

8. An armless transparency projector as claimed in claim 1 or claim 5, wherein said guiding board is a guiding grooved board.

* * * * *

UNITED STATES PATENT AND TRADEMARK OFFICE
CERTIFICATE OF CORRECTION

PATENT NO.    : 5,442,415
DATED         : August 15, 1995
INVENTOR(S)   : Zu W. CHAO It is certified that error appears in the above-indentified patent and that said Letters Patent is hereby corrected as shown below:

Title page, item [73], change the address from "Tawain, Taiwan" to --Hsinchu, Taiwan--.

Signed and Sealed this

Eighth Day of October, 1996

*Attest:*

BRUCE LEHMAN

*Attesting Officer*     *Commissioner of Patents and Trademarks*